Aug. 25, 1925.
C. A. BAHN
1,550,941
OPTICAL INSTRUMENT
Filed Oct. 23, 1923    2 Sheets-Sheet 1
*retinoscope*
*ophthalmoscope*
*mirror adjustable*
*self luminous indicator on disc 67*
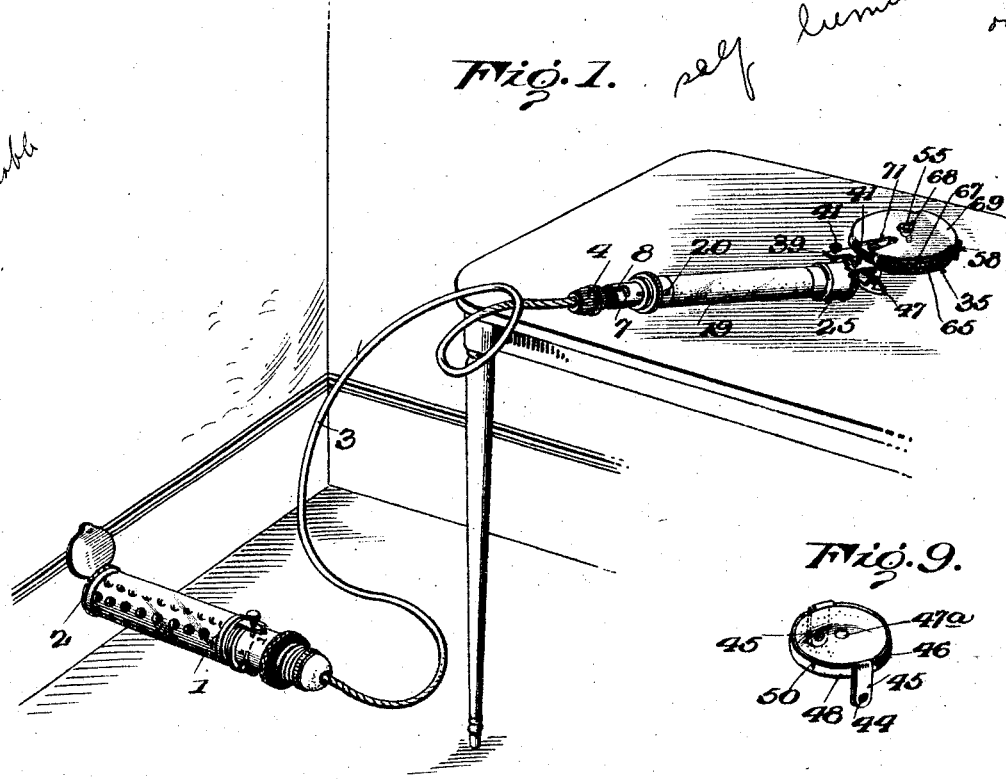
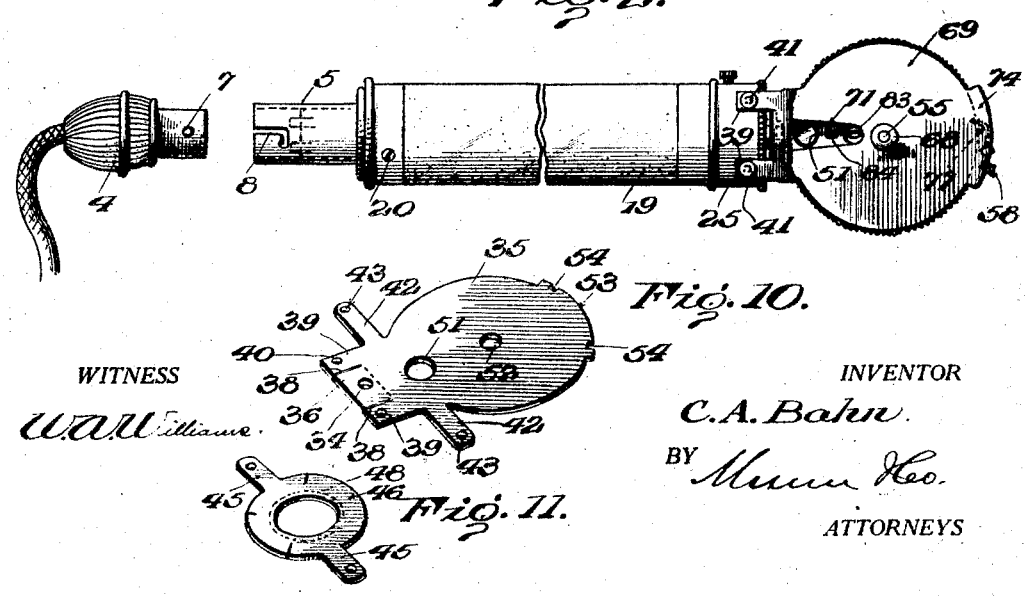
WITNESS
W. A. Williams
INVENTOR
C. A. Bahn
BY
Munn &co.
ATTORNEYS

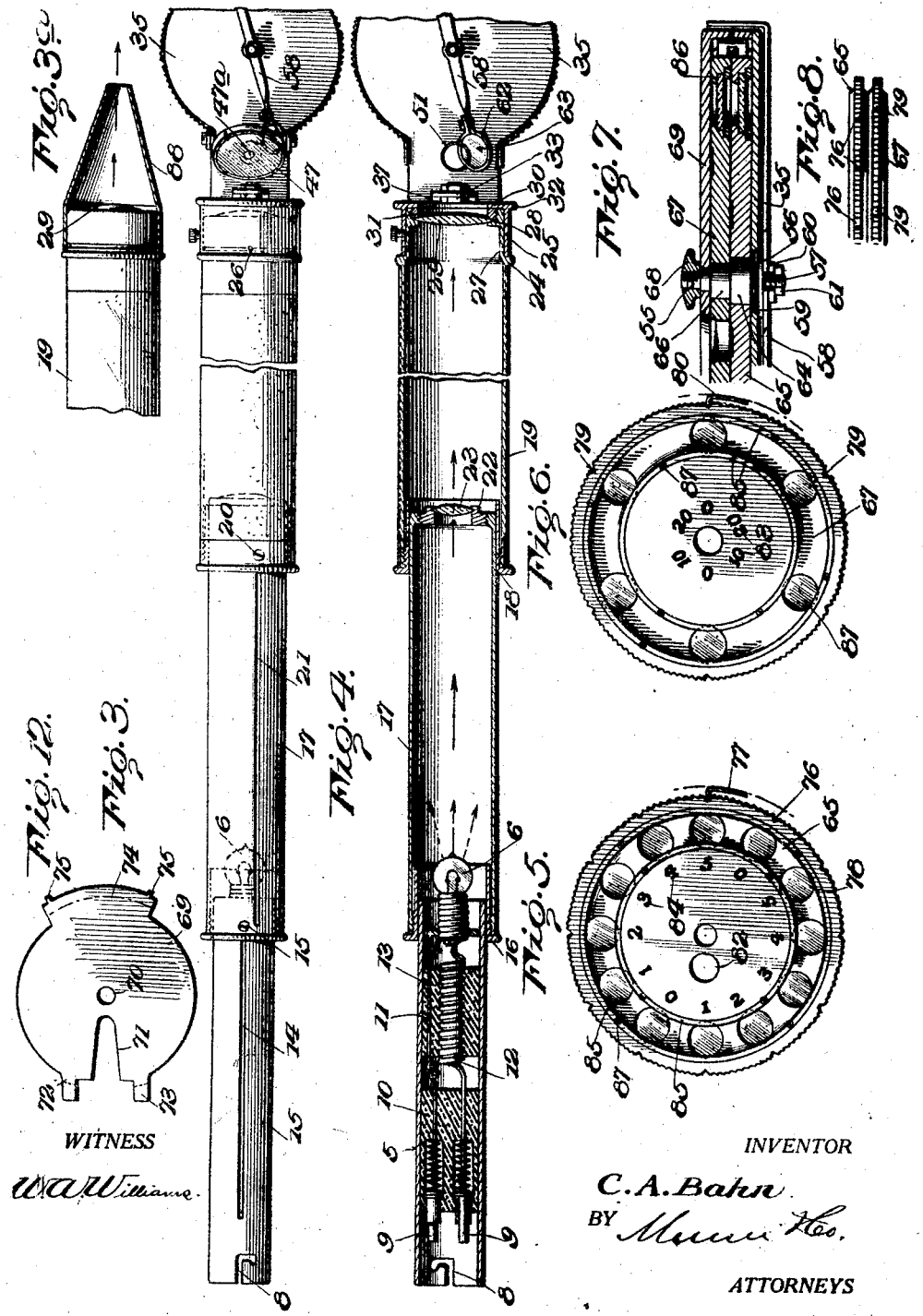

Patented Aug. 25, 1925.

1,550,941

UNITED STATES PATENT OFFICE.

CHARLES ADOLPH BAHN, OF NEW ORLEANS, LOUISIANA.

OPTICAL INSTRUMENT.

Application filed October 23, 1923. Serial No. 670,326.

*To all whom it may concern:*

Be it known that I, CHARLES ADOLPH BAHN, a citizen of the United States, and a resident of New Orleans, in the parish of Orleans and State of Louisiana, have invented certain new and useful Improvements in Optical Instruments, of which the following is a specification.

This invention relates to diagnostic instruments and is more particularly directed to an instrument for use as an ophthalmoscope, retinoscope and focal illuminating device, including the employment of the same as a slit light, trans-illuminator, and for other purposes for which a specially constructed illuminating device adapts the same.

Another object of the invention is the provision of a simple, compact and unitary portable structure adapted to be employed as a diagnostic instrument more particularly in the examination of eyes and which may be connected to any ordinary socket in a house or office building.

Another object of the invention is the provision of a device having a source of light and lenses for projecting beams of light, with each of the lenses or lens systems, adjustable relative to the other lens or lens systems, and with the light adjustable relative to either or both of the lenses.

A further object of the invention is the provision of a device having telescoping tubes carrying an electric lamp and a mirror set at an angle to the axis of the tubes and designed to reflect the rays of light from the lamp at a substantially 90° angle, the mirror being adjustable to vary the angle of incidence and consequently the angle of reflection.

A still further object of the invention is the provision of a device which functions not only as a retinoscope but as an ophthalmoscope without necessitating the replacement of any of the elements of the device.

Another object of the invention is the provision of a device in which the reflecting mirror is not only adapted to be adjusted at an angle relative to the axis of the tube but by a plurality of independent adjustments, the mirror is adapted to be oscillated across the axis of said tube and revolved out of center about said axis whereby the light projecting upon the mirror is de-centered.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a view in perspective of my improved ophthalmoscope showing its connection with a house current and a controlling rheostat.

Figure 2 is a longitudinal front view of the same.

Figure 3 is a longitudinal rear view of the ophthalmoscope with the telescoping tubes extended.

Figure 3ª is a fragmentary view partly in section showing the application of the trans-illuminator used in connection with my device.

Figure 4 is a longitudinal section of the device shown in Figure 3.

Figure 5 is a plan view of a rotatable disc carrying a plurality of lenses.

Figure 6 is a plan view of another disc carrying a plurality of lenses adapted to cooperate with the lenses of the disc shown in Figure 5.

Figure 7 is a fragmentary view in section of the ophthalmoscope per se.

Figure 8 is an enlarged detail disclosing more particularly the peripheries of the lens-carrying discs.

Figure 9 is a view in perspective showing the detail of the oscillating mirror support.

Figure 10 is a view in perspective of a blank forming the rear plate of the ophthalmoscope.

Figure 11 is a plan view of a blank from which the support shown in Figure 9 is constructed.

Figure 12 is a plan view of a blank from which the front plate of the ophthalmoscope is constructed.

Referring more particularly to the drawings, 1 designates a rheostat adapted to be directly connected to a socket 2 of a house current. A flexible cord 3 carrying conducting wires connects the rheostat with a plug 4 adapted to be inserted within a tube 5 which carries a light bulb 6. The plug 4 is provided with a pin 7 adapted to be received within a bayonet slot 8 at the bottom of the tube 5 whereby the plug may be locked against displacement within the tube.

A pair of contact members 9 are mounted in an insulated member 10 within the tube 5 and are adapted to be electrically connected through wires 11 and 12 mounted in an insulating block 13. The wires are connected to the socket of the electric light bulb 6.

The tube 5 is provided with a longitudinal slot 14 into which is adapted to be projected the inner end of a set screw 15 which is mounted in a threaded collar 16. The collar has a threaded engagement with the lower end of a tube 17. The slot 14 and the cooperating pin 15 permits the tube 5 to be telescoped within tube 17 but prevents rotation of tube 5 in tube 17.

A sleeve 18 has a threaded engagement with a barrel or handle member 19 and the tube 17 is slidable within the sleeve 18 and likewise the barrel 19. A set screw 20 mounted in the sleeve 18 is adapted to engage a longitudinal slot 21 formed in the tube 17 and permit tube 17 to be telescoped within barrel 19 and maintain the tube 17 against rotation during such telescoping movement.

The upper end of tube 17 is provided with a threaded opening adapted to receive a threaded ring 22 in which is mounted a convex lens 23. The upper end of the barrel is provided with a shoulder 24 upon which is seated the inner end of a sleeve portion of a cap 25. The sleeve portion is provided with a bayonet slot or groove 27 adapted to receive a pin mounted on the sleeve portion of the cap whereby the cap 25 may be rotated but maintained against disengagement from said barrel.

The upper end of the barrel 19 is internally threaded to receive the external threads of a ring 28 in which is mounted a convex lens 29. The cap 25 is cut away centrally to form an opening 31 which is bounded by an annular flange 30. The rays of light from the lamp 6 are projected by means of the cooperating convex lenses 23 and 29, through the opening 31. The flange 30 is in engagement with the ring 28.

An annular shoulder 32 is formed exteriorly of the cap 25 and upon which is mounted a pivot pin 33. The pin is threaded at its lower end and screwed into a threaded perforation in said shoulder. The pin 33 is adapted to be received within a perforation 34 see Figure 10 of a substantially cylindrical backing plate 35. The perforation is formed in a lug 36 which is adapted to be bent at right angles to the plane of the plate 35 so that the lug 36 may be positioned horizontally and locked in position by means of lock nuts 37 and support the plate 35 in a substantially vertical position, and normally parallel to the axis of the barrel 19. The plate 35 is adapted to be revolved about the axis of the pivot pin 33 while being maintained longitudinally along the axis of said barrel.

As shown more particularly in Figure 10, the lower reduced portion of plate 35 is provided with two cuts 38 to form the lug 36 and a pair of ears 39. The ears are provided with threaded perforations 40 and adapted to receive set screws 41.

The lug 36 being integrally formed with plate 35 oscillates on pin 33 with the oscillating of the backing plate. Set screws 41 are adapted to have their free ends engage the outer wall of the sleeve portion of the cap 25 and are for the purpose of adjusting the position of the backing plate relative to the longitudinal axis of the telescoping tubes 5, 17 and 19. Below the substantially circular portion of the backing plate 35 are provided laterally projecting lugs 42 which are provided with threaded perforations 43 into which are screwed pintles. These pintles are received by perforations 44 of a pair of depending ears 45 formed integrally with an annular support 46 which is adapted to receive a mirror 47. The support 46 is rotatable on the pintles and is provided with a central sight opening 47ª.

As shown more particularly in Figure 9, the ring is provided with an annular inturned flange 48 for forming a seat for the mirror while the periphery of the ring 46 is split as shown at 50 so that when the mirror is forced into the ring upon the flange 48, the mirror will have a friction-tight engagement with the ring and maintain the mirror against displacement. The segments of the ring formed by splitting said ring act as clamps which grip the periphery of the mirror.

It will be seen from Figure 11 that the ring 46 and ears 45 are formed from a blank which is stamped from a single piece of metal. The backing plate 35 as shown more particularly in Figure 10, is likewise stamped or cut from a single sheet of metal.

The backing plate is provided with an opening 51 at its lower end, a central threaded opening 52, an extended arcuately shaped flange 53 and slots 54 for a purpose which will be presently described.

An axle 55, shown more particularly in Figure 8, provided with stepped portions, has an enlarged externally threaded annular shoulder 56 adapted to be screwed into the threaded opening 52 in the backing plate 35. Said axle is provided with a shoulder 59 which abuts the backing plate and locks the axle against the backing plate. The axle 55 is provided with a reduced portion 57 upon which is received an oscillating arm 58 in engagement with the shoulder 59 of said axle. A washer 60 received by the reduced portion 57 of the axle is locked against the oscillating arm 58 by means of a nut 61 screwed onto a threaded portion of said axle. The lower end of the arm 58 is curved to form mounting 62 adapted to receive a colored transparent member 63 and when desired the transparent member may be moved into register with the perforation 51 in the backing plate 35. The free end of the curved mounting is clamped to the arm 58 by means of a screw.

A second shoulder 64 is formed on the axle 55 and adapted to receive a central perforation of a rotatable disc 65. A third shoulder 66 adjacent the shoulder 64 and slightly reduced in diameter is adapted to receive a central perforation in a rotatable disc 67. The outer reduced end of the axle 55 is threaded to receive a knurled nut 68 for locking a front plate 69 in position against one face of the disc 67. The front plate is provided with a central perforation 70 adapted to be received upon a reduced portion of the axle 55.

The front plate 69, shown in blank form in Figure 12, is provided with a V-shaped slot 71 adjacent its lower end for a purpose which will be presently described. The downwardly depending ears 72 are bent inwardly and adapted to be engaged around the periphery of the rotatable disc 67 with the inturned portions 73 in engagement with said disc. The upper end of the front plate is provided with a flange 74 in the form of a sector adapted to be bent over the top of the rotatable discs 65 and 67.

As shown more particularly in Figure 8, lugs 75 formed on the periphery of the flange 74 are adapted to be received within the notches 54 of the backing plate 35. Both of the rotatable discs 65 and 67 have knurled peripheries and at predetermined points along the circumference of the disc 65 are formed notches 76 adapted to be engaged by a resilient pawl 77 for predeterminedly positioning the lenses 78 before the opening 51 in the backing plate 35. Disc 67 is likewise provided with a plurality of spaced notches 79 adapted to be engaged by a pawl 80 forming part of the pawl 77 for predeterminedly positioning lenses 81 before the opening 51 in the backing plate 35 and to register with certain of the lenses 78 of the rotatable disc 65. The combined pawls 77 and 80 are secured upon the inner face of the flange 74.

Disc 65 is provided with a sight opening 82 adapted to register with numerals 83 formed along the circumference of a circle and described along one face of the disc 67 so that the said numerals may be viewed when desired, through the opening 82.

Numerals 84 are adapted to register with the notch 71 in the front plate 69 where the numerals may be read. The sight opening 82 in disc 65 likewise registers with the notch 71 for the reading of the numerals 83 on the rotatable disc 67.

The lenses 78 of the disc 65 and the lenses 81 of the disc 67 are mounted within sockets 86, shown more particularly in Figure 8, and are adapted to be held in place by means of rings 85 mounted in circular concentric grooves cutting the sockets at diametrically opposite points. The rings are preferably formed of wire of small diameter and are secured in place by means of screws 87.

When desired, a conical shaped tube 88 is adapted to be mounted upon the barrel 19 for purposes of trans-illumination of various parts of the human body.

It must be borne in mind that the device combines the functions of not only a retinoscope with that of an ophthalmoscope but likewise with that of a focal illuminating device, including the use of the device as a trans-illuminator.

The adjustment of the light 6 relative to the lenses 23 and 29, combined or individually, produce focal combinations which determine the use of the instrument as a retinoscope, ophthalmoscope or focal illuminating device.

When employed as a retinoscope, the necessary degree of divergence of the rays is produced by withdrawing the telescoping tube 17 partially from the barrel 19 while maintaining the tube 5, carrying the source of light, projected to its limit within tube 17. This describes the first method of employing the device as a retinoscope.

The second method gives a crossed divergent beam and is accomplished by further extending the tube 17 from the barrel 19 but still maintaining the light bulb in its normal inward position.

The third method of using the device as a retinoscope produces a type of retinoscopic shadow similar to that formed in method #1 and is obtained by a substantial total withdrawal of tube 17 and a partial withdrawal of tube 5 from tube 17. The extent of the withdrawal of tube 5 from 17 depends upon the results desired.

The retinoscopic shadow produced in methods #1 and #3 corresponds to that produced by the method which is ordinarily known as plain mirror retinoscopy, whereas method #2 produces a reverse shadow similar to that ordinarily known as concave retinoscopy.

All three methods of operation may be accomplished at the distances ordinarily used in this method of examination.

When the device is employed as an ophthalmoscope in the method ordinarily known as the direct method it can be used either with centric or eccentric illumination. The centric illumination method is obtained by slightly withdrawing the tube 17 from the barrel 19 sufficiently to obtain the most desirable degree of divergence, the tube 15 being contracted, that is in substantial contact with the lens 23.

By the eccentric illumination method the tube 17 is approximately completely withdrawn from the barrel 19, while the tube 5 is withdrawn sufficiently to obtain a spot of illumination on the mirror 47 less than its radius. The backing plate 35 is then revolved sufficiently that the margin of the aperture in the mirror 47 corresponds with the periphery of the illumination, the aperture of the mirror 47 remaining un-illuminated.

The instrument is also adapted for what is generally known as the indirect method of ophthalmoscopy which may be employed either with a centric or eccentric illumination. The centric method is obtained by withdrawing the tube 17 from the barrel 19 sufficiently to form a conjugated focus of the light at approximately the distance at which the indirect method is employed. The eccentric method of indirect ophthalmoscopy is obtained in practically the same manner as described under the caption of direct eccentric ophthalmoscopy.

The disc 67 at a point on its face adjacent its periphery and below a sight opening in said disc is provided with an insert 90 coated with some form of illuminating paint which will glow in the dark for aiding in locating said disc at the neutral point.

Additional tubes carrying lenses or a system of lenses may be telescoped within each other and cooperating with the tube 17 and barrel 19 without making any changes in the scope of the invention.

What I claim is:

1. In a device of the character described, a barrel, telescoping tubes mounted for sliding movement in the barrel, one of said tubes carrying a source of light, the other tube being provided with a projecting lens, the barrel being provided with a projecting lens, a backing plate mounted for oscillation about the axis of the tubes, a mirror carried by the backing plate and adapted to be adjusted at varying angles to the axis of the tubes, discs provided with a plurality of lenses adjacent their peripheries mounted for independent rotation upon the backing plate, a sight opening adapted to register with the lenses in the rotatable discs, said mirror being provided with a central opening adapted to register with the sight opening in the backing plate.

2. In a device of the character described, a barrel, a pair of telescoping tubes mounted for sliding movement in the barrel, one of said tubes carrying a source of light, the other tube being provided with a projecting lens, the barrel being provided with a projecting lens, a backing plate mounted for oscillation about the axis of the tubes, a mirror carried by the backing plate and adapted to be adjusted at varying angles to the axis of the tubes, discs provided with a plurality of lenses adjacent their peripheries mounted for independent rotation upon the backing plate, a sight opening adapted to register with the lenses in the rotatable discs, said mirror being provided with a central opening adapted to register with the sight opening in the backing plate, and means for locking the backing plate in a plurality of different angular positions about the axis of the tube.

3. In a device of the character described, a barrel, telescoping tubes mounted for sliding movement in the barrel, one of said tubes carrying a source of light, the other tube being provided with a projecting lens, the barrel being provided with a projecting lens, a cap mounted for rotation on the top of the barrel and provided with an opening in alinement with the axis of the barrel, a backing plate mounted for oscillation on the cap about the axis of the tubes, a mirror carried by the backing plate and adapted to be adjusted at an angle to the axis of the tubes, discs provided with a plurality of lenses adjacent their peripheries mounted for independent rotation upon the backing pate, a sight opening adapted to register with the lenses in the rotatable discs, said mirror being provided with a central opening adapted to register with the sight opening in the backing plate.

4. In a device of the character described, a barrel forming a hand grip, a source of light adjustable within the barrel, a cap mounted for rotation on the top of the barrel and provided with an opening in alinement with the axis of the barrel, a backing plate provided with a sight opening and pivoted on the top of the cap adjacent its periphery and adapted to be oscillated about the axis of the barrel, a mirror carried by the backing plate and adapted to be adjusted at an angle to the axis of the tube, the rotation of the cap causing rotation of the mirror about the axis of the barrel, said backing plate being extended outwardly from the cap and along the axis of the barrel, discs provided with a plurality of lenses mounted for independent rotation upon the backing plate whereby the lenses will register with the sight opening in the backing plate, said mirror being provided with a central opening adapted to register with the sight opening in the backing plate.

5. In a device of the character described, a barrel, a cap mounted for rotation on the top of the barrel and provided with an opening in alinement with the axis of the barrel, means permitting rotation of the cap but preventing displacement of the cap from said barrel, a backing plate provided with a sight opening having a laterally projecting lug pivotally connected with the cap to permit oscillation of the backing plate about the axis of the barrel, lugs projecting inwardly from the backing plate, a support pivotally connected with the lugs, a mirror mounted in the support and adapted to be oscillated on an axis which is at right angles to the axis of the barrel, said mirror being provided with a sight opening adapted to register with the sight opening in the backing plate, a plurality of discs provided with lenses mounted for rotation on the backing plate with the lenses registering with the sight opening in the backing plate.

6. In a device of the character described, a barrel, a cap mounted for rotation on the top of the barrel and provided with an opening in alinement with the axis of the barrel, means permitting rotation of the cap but preventing displacement of the cap from said barrel, a backing plate provided with a sight opening having a laterally projecting lug pivotally connected with the cap to permit oscillation of the backing plate about the axis of the barrel, lugs projecting inwardly from the backing plate, a support pivotally connected with the lugs, a mirror mounted in the support and adapted to be oscillated on an axis which is at right angles to the axis of the barrel, said mirror being provided with a sight opening adapted to register with the sight opening in the backing plate, a plurality of discs provided with lenses mounted for rotation on the backing plate with the lenses registering with the sight opening in the backing plate, a lever pivotally connected with the backing plate and provided with a transparent medium at its lower free end adapted to register with the sight opening in the backing plate.

7. In a device of the character described, a barrel, a cap mounted for rotation on the top of the barrel and provided with an opening in alinement with the axis of the barrel, means permitting rotation of the cap but preventing displacement of the cap from said barrel, a backing plate provided with a sight opening having a laterally projecting lug pivotally connected with the cap to permit oscillation of the backing plate about the axis of the barrel, lugs projecting inwardly from the backing plate, a support pivotally connected with the lugs, a mirror mounted in the support and adapted to be oscillated on an axis which is at right angles to the axis of the barrel, said mirror being provided with a sight opening adapted to register with the sight opening in the backing plate, a plurality of discs provided with lenses mounted for rotation on the backing plate with the lenses registering with the sight opening in the backing plate, a front plate having a slotted lower end adapted to register with the sight opening in the backing plate and rigidly connected with the backing plate, the disc being embraced between the front and backing plates.

8. In a device of the character described, a barrel, a cap mounted for rotation on the top of the barrel and provided with an opening in alinement with the axis of the barrel, means permitting rotation of the cap but preventing displacement of the cap from said barrel, a backing plate provided with a sight opening having a laterally projecting lug pivotally connected with the cap to permit oscillation of the backing plate about the axis of the barrel, lugs projecting inwardly from the backing plate, a support pivotally connected with the lugs, a mirror mounted in the support and adapted to be oscillated on an axis which is at right angles to the axis of the barrel, said mirror being provided with a sight opening adapted to register with the sight opening in the backing plate, a plurality of discs provided with lenses mounted for rotation on the backing plate with the lenses registering with the sight opening in the backing plate, a front plate having a slotted lower end adapted to register with the sight opening in the backing plate and rigidly connected with the backing plate, the discs being embraced between the front and backing plates, said rotatable discs being provided with notches on their peripheries, and spring pawls secured to the front plate and adapted to engage the notches in the rotatable discs for causing the lenses in said discs to register with the sight opening in the backing plates.

9. In a device of the character described, a barrel, a backing plate mounted for oscillation on the barrel, a mirror mounted for rotation on the backing plate, and adapted for oscillation across the axis of the barrel, discs mounted for rotation on the backing plate, said discs being provided with openings and sockets formed in the discs and embracing the openings, the discs being provided with a pair of annular grooves cutting the sockets at diametrically opposite points on the peripheries of the sockets, lenses mounted in the sockets, and rings fitting into the grooves for locking the lenses in position, and means for securing the rings in position.

10. In a device of the character described, a barrel, telescoping tubes mounted for sliding movement in the barrel, one of said tubes carrying a source of light, projecting lenses mounted in the barrel and the other telescoping tubes, a mirror disposed across the axis of the barrel for reflecting light varied by the differential adjustment of the telescoping tubes within the barrel and adapted to be oscillated across the axis of the barrel.

11. In a device of the class described, a barrel, a source of light mounted within the barrel, a rotatable cap mounted on one end of the barrel and provided with an opening through which the rays of light are projected, a mirror pivoted on the rotatable cap and adapted to be oscillated across the axis of the barrel.

12. In a device of the character described, a barrel, a source of light mounted within the barrel, a rotatable cap mounted on the end of the barrel and provided with an opening through which light is adapted to be projected, a supporting plate having a sight opening and mounted upon the cap and extended parallel to the axis of the barrel, said plate adapted to be oscillated about an axis parallel to the axis of the barrel, and a mirror having a sight opening adapted to register with the sight opening in the plate and pivotally mounted on the plate and adapted to be oscillated across the axis of the barrel.

13. In a device of the character described, a barrel, a source of light mounted within the barrel, a rotatable cap mounted on the end of the barrel and provided with an opening through which light is adapted to be projected, a supporting plate having a sight opening and mounted upon the cap, said plate adapted to be oscillated about an axis parallel to the axis of the barrel, and a mirror having a sight opening adapted to register with the sight opening in the plate and pivotally mounted on the plate and adapted to be oscillated across the axis of the barrel, said supporting plate adapted to be revolved by the rotatable cap about the axis of the barrel.

14. In a device of the class described, a barrel, a source of light mounted within the barrel, a cap mounted for rotation on the barrel and provided with an opening through which the light is adapted to be projected, a supporting plate mounted on the cap, a mirror carried by the plate, said mirror and plate adapted to be revolved about the axis of the barrel by the rotatable cap and oscillated across said axis.

15. In a device of the character described, a barrel, a source of light within the barrel, a supporting plate mounted on the barrel and provided with a sight opening, discs provided with lenses rotatably mounted on the supporting plate, with the lenses adapted to register with the sight opening in the plate, and an arm pivoted intermediate its ends on the supporting plate and provided with a colored transparent member adapted to register with the sight opening in the supporting plate.

16. In a device of the class described, a barrel, a source of light mounted within the barrel, a mirror, means for mounting the mirror on the barrel so that the mirror may be revolved about the axis of the barrel and about the axis of the light rays projected from the barrel, said mounting including means for permitting rocking of the mirror at right angles to the axis of the barrel.

17. In a device of the class described, a barrel, a source of light mounted within the barrel, means for varying the focusing of the light rays, a mirror, a mounting for said mirror to permit rocking of the mirror and revolving of the mirror about the axis of the barrel.

CHARLES ADOLPH BAHN.